(12) United States Patent
Spitz et al.

(10) Patent No.: US 10,789,631 B2
(45) Date of Patent: *Sep. 29, 2020

(54) APPARATUS AND METHOD FOR PEER-ASSISTED E-COMMERCE SHOPPING

(71) Applicant: AiBUY, Inc., Dallas, TX (US)

(72) Inventors: Robert K. Spitz, Amherst, NH (US); Todd Downing, Irving, TX (US); Christian Briggs, Austin, TX (US)

(73) Assignee: AiBuy, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,204

(22) Filed: Oct. 10, 2014

(65) Prior Publication Data

US 2015/0039468 A1 Feb. 5, 2015

Related U.S. Application Data

(63) Continuation-in-part of application No. 13/923,089, filed on Jun. 20, 2013, now Pat. No. 9,607,330.

(Continued)

(51) Int. Cl.
*G06Q 30/06* (2012.01)
*H04N 7/14* (2006.01)
*H04L 29/08* (2006.01)

(52) U.S. Cl.
CPC ......... *G06Q 30/0613* (2013.01); *G06Q 30/06* (2013.01); *G06Q 30/0633* (2013.01); *H04L 67/10* (2013.01); *H04N 7/141* (2013.01)

(58) Field of Classification Search
CPC .............. G06Q 30/0613; G06Q 30/06; G06Q 30/0633; H04L 67/10; H04N 7/141
(Continued)

(56) References Cited

U.S. PATENT DOCUMENTS

| 5,715,400 A | 2/1998 | Reimer et al. |
| 5,774,664 A | 6/1998 | Hidary et al. |

(Continued)

FOREIGN PATENT DOCUMENTS

| CN | 101127108 A | 2/2008 |
| CN | 101772779 A | 7/2010 |

(Continued)

OTHER PUBLICATIONS

Anonymous, Shop Alone No Longer: FriendShopper.com Brings the Live Shopping Experience to E-Commerce: New Online Shopping Platform Connects Friends in Real-Time, 2009, Jul. 7, PR Newswire, p. 1. (Year: 2009).*

(Continued)

*Primary Examiner* — Jason B Dunham
*Assistant Examiner* — Brittany E Bargeon

(57) ABSTRACT

A method for peer-assisted shopping including receiving, at a first device, a transacting media container comprising base content and supplemental content related to one or more items in the base content. The method also includes receiving a selection of at least one of the one or more items. The method also includes initiating a first shopping cart within the transacting media container of the first device, the first shopping cart identifying the at least one selected item. The method also includes establishing a communication channel with a second device. The method also includes transmitting information to synchronize a second shopping cart associated with the second device with the first shopping cart.

31 Claims, 6 Drawing Sheets

Related U.S. Application Data

(60) Provisional application No. 61/889,377, filed on Oct. 10, 2013, provisional application No. 61/889,330, filed on Oct. 10, 2013, provisional application No. 61/662,765, filed on Jun. 21, 2012.

(58) Field of Classification Search
USPC .................................................... 705/26.41
See application file for complete search history.

(56) References Cited

U.S. PATENT DOCUMENTS

| | | |
|---|---|---|
| 5,778,181 A | 7/1998 | Hidary et al. |
| 5,903,816 A | 5/1999 | Broadwin et al. |
| 5,929,849 A | 7/1999 | Kikinis |
| 6,006,257 A | 12/1999 | Slezak |
| 6,009,410 A | 12/1999 | LeMole et al. |
| 6,014,638 A | 1/2000 | Burge et al. |
| 6,018,768 A | 1/2000 | Ullman et al. |
| 6,154,771 A | 11/2000 | Rangan et al. |
| 6,169,573 B1 | 1/2001 | Sampath-Kumar et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,357,042 B2 | 3/2002 | Srinivasan et al. |
| 6,536,041 B1 | 3/2003 | Knudson et al. |
| 6,553,566 B1 | 4/2003 | Grant et al. |
| 6,564,380 B1 | 5/2003 | Murphy |
| 6,573,907 B1 | 6/2003 | Madrane |
| 6,628,307 B1 | 9/2003 | Fair |
| 6,766,528 B1 | 7/2004 | Kim et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,941,575 B2 | 9/2005 | Allen |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,136,853 B1 | 11/2006 | Kohda et al. |
| 7,158,676 B1 | 1/2007 | Rainsford |
| 7,162,263 B2 | 1/2007 | King et al. |
| 7,168,051 B2 | 1/2007 | Robinson et al. |
| 7,188,186 B1 | 3/2007 | Meyer et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,269,837 B1 | 9/2007 | Redling et al. |
| 7,331,057 B2 | 2/2008 | Eldering et al. |
| 7,353,186 B2 | 4/2008 | Kobayashi |
| 7,409,437 B2 | 8/2008 | Ullman et al. |
| 7,412,406 B2 | 8/2008 | Rosenberg |
| 7,432,768 B2 | 10/2008 | Han et al. |
| 7,444,659 B2 | 10/2008 | Lemmons |
| 7,464,344 B1 | 12/2008 | Carmichael et al. |
| 7,485,397 B2 | 2/2009 | Eck et al. |
| 7,487,112 B2 | 2/2009 | Barnes, Jr. |
| 7,509,340 B2 | 3/2009 | Fenton et al. |
| 7,539,738 B2 | 5/2009 | Stuckman et al. |
| 7,574,381 B1 | 8/2009 | Lin-Hendel |
| 7,593,965 B2 | 9/2009 | Gabriel |
| 7,613,691 B2 | 11/2009 | Finch |
| 7,614,013 B2 | 11/2009 | Dollar et al. |
| 7,624,416 B1 | 11/2009 | Vandermolen et al. |
| 7,631,327 B2 | 12/2009 | Dempski et al. |
| 7,661,121 B2 | 2/2010 | Smith et al. |
| 7,664,678 B1 | 2/2010 | Haber |
| 7,673,017 B2 | 3/2010 | Kim et al. |
| 7,691,666 B2 | 4/2010 | Levy et al. |
| 7,721,307 B2 | 5/2010 | Hendricks et al. |
| 7,725,362 B2 | 5/2010 | Weathers, Jr. |
| 7,739,596 B2 | 6/2010 | Clarke-Martin et al. |
| 7,747,037 B2 | 6/2010 | Hein, III |
| 7,750,343 B2 | 7/2010 | Choi et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,773,093 B2 | 8/2010 | Bates et al. |
| 7,774,161 B2 | 8/2010 | Tischer |
| 7,774,815 B1 | 8/2010 | Allen |
| 7,796,941 B2 | 9/2010 | Poltorak |
| 7,800,102 B2 | 9/2010 | Park et al. |
| 7,804,506 B2 | 9/2010 | Bates et al. |
| 7,818,763 B2 | 10/2010 | Sie et al. |
| 7,870,592 B2 | 1/2011 | Hudson et al. |
| 7,885,951 B1 | 2/2011 | Rothschild |
| 7,892,216 B2 | 2/2011 | Fangrow, Jr. |
| 7,899,719 B2 | 3/2011 | Lin-Hendel |
| 7,912,753 B2 | 3/2011 | Struble |
| 7,923,722 B2 | 4/2011 | Ryu et al. |
| 7,923,772 B2 | 4/2011 | Mauder et al. |
| 7,925,973 B2 | 4/2011 | Allaire et al. |
| 7,946,492 B2 | 5/2011 | Rohs |
| 7,975,020 B1 | 7/2011 | Green et al. |
| 7,975,062 B2 | 7/2011 | Krikorian et al. |
| 7,979,877 B2 | 7/2011 | Huber et al. |
| 7,982,216 B2 | 7/2011 | Imai |
| 7,987,098 B2 | 7/2011 | Schifone |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B1 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,117,281 B2 | 2/2012 | Robinson et al. |
| 8,122,480 B2 | 2/2012 | Sholtis |
| 8,132,486 B1 | 3/2012 | Calvert |
| 8,141,112 B2 | 3/2012 | Cope et al. |
| 8,150,743 B2 | 4/2012 | Brown |
| 8,181,212 B2 | 5/2012 | Sigal |
| 8,196,162 B2 | 6/2012 | Van De Klashorst |
| 8,234,218 B2 | 7/2012 | Robinson et al. |
| 8,244,830 B2 | 8/2012 | Robinson et al. |
| 8,312,486 B1 | 11/2012 | Briggs et al. |
| 8,316,450 B2 | 11/2012 | Robinson et al. |
| 8,341,152 B1 | 12/2012 | Bates |
| 8,356,077 B2 | 1/2013 | Robinson et al. |
| 8,423,467 B1 | 4/2013 | Johansson et al. |
| 8,433,611 B2 | 4/2013 | Lax et al. |
| 8,438,646 B2 | 5/2013 | Sidi |
| 8,458,053 B1 | 6/2013 | Buron et al. |
| 8,468,562 B2 | 6/2013 | Miller et al. |
| 8,549,555 B2 | 10/2013 | Briggs et al. |
| 8,615,474 B2 | 12/2013 | Avedissian et al. |
| 8,635,169 B2 | 1/2014 | Avedissian et al. |
| 8,639,621 B1 | 1/2014 | Ellis et al. |
| 8,645,214 B2 | 2/2014 | Hipolito et al. |
| 8,645,217 B2 | 2/2014 | Siegel et al. |
| 8,645,991 B2 | 2/2014 | McIntire et al. |
| 8,655,146 B2 | 2/2014 | Bennett et al. |
| 8,682,809 B2 | 3/2014 | Avedissian et al. |
| 8,707,185 B2 | 4/2014 | Robinson et al. |
| 8,708,223 B2 | 4/2014 | Gates et al. |
| 8,725,826 B2 | 5/2014 | Robinson et al. |
| 8,752,083 B2 | 6/2014 | Geer, III et al. |
| 8,769,016 B2 | 7/2014 | Jakobson |
| 8,769,053 B2 | 7/2014 | Spitz et al. |
| 8,769,584 B2 | 7/2014 | Neumeier et al. |
| 8,782,690 B2 | 7/2014 | Briggs et al. |
| 8,813,132 B2 | 8/2014 | Andrews, II et al. |
| 8,818,941 B2 | 8/2014 | Kiilerich et al. |
| 8,893,173 B2 | 11/2014 | Briggs et al. |
| 9,451,010 B2 | 9/2016 | Spitz et al. |

(56) References Cited

U.S. PATENT DOCUMENTS

| | | |
|---|---|---|
| 9,607,330 B2 | 3/2017 | Spitz et al. |
| 10,171,555 B2 | 1/2019 | Spitz et al. |
| 2002/0059196 A1 | 5/2002 | I'Anson et al. |
| 2002/0062481 A1 | 5/2002 | Slaney et al. |
| 2002/0075332 A1 | 6/2002 | Geilfuss, Jr. et al. |
| 2002/0083447 A1 | 6/2002 | Heron et al. |
| 2002/0083469 A1 | 6/2002 | Jeannin et al. |
| 2002/0126990 A1 | 9/2002 | Rasmussen et al. |
| 2002/0199181 A1 | 12/2002 | Allen |
| 2003/0023490 A1 | 1/2003 | Lenyon et al. |
| 2003/0028873 A1 | 2/2003 | Lemmons |
| 2003/0055723 A1 | 3/2003 | English |
| 2003/0135563 A1 | 7/2003 | Bodin et al. |
| 2003/0149983 A1 | 8/2003 | Markel |
| 2003/0163832 A1 | 8/2003 | Tsuria et al. |
| 2003/0228615 A1 | 12/2003 | Rossi et al. |
| 2003/0231851 A1 | 12/2003 | Rantala et al. |
| 2004/0021684 A1 | 2/2004 | Millner |
| 2005/0022226 A1 | 1/2005 | Ackley et al. |
| 2005/0033656 A1* | 2/2005 | Wang et al. .................. 705/26 |
| 2005/0076372 A1 | 4/2005 | Moore et al. |
| 2005/0091107 A1 | 4/2005 | Blum |
| 2006/0009243 A1 | 1/2006 | Dahan et al. |
| 2006/0010171 A1 | 1/2006 | Lei |
| 2006/0089843 A1 | 4/2006 | Flather |
| 2006/0122895 A1 | 6/2006 | Abraham et al. |
| 2006/0136305 A1 | 6/2006 | Fitzsimmons et al. |
| 2006/0202191 A1 | 9/2006 | Gerlach et al. |
| 2006/0242016 A1 | 10/2006 | Chenard |
| 2006/0256133 A1 | 11/2006 | Rosenberg |
| 2006/0265657 A1 | 11/2006 | Gilley |
| 2006/0276266 A1 | 12/2006 | Sullivan |
| 2007/0030080 A1 | 2/2007 | Han et al. |
| 2007/0087489 A1 | 4/2007 | Park et al. |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0250901 A1 | 10/2007 | McIntire et al. |
| 2007/0266399 A1 | 11/2007 | Sidi |
| 2007/0271149 A1* | 11/2007 | Siegel et al. .................. 705/26 |
| 2007/0276721 A1 | 11/2007 | Jackson |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0065990 A1 | 3/2008 | Harrison et al. |
| 2008/0066099 A1 | 3/2008 | Brodersen et al. |
| 2008/0066107 A1 | 3/2008 | Moonka et al. |
| 2008/0097843 A1 | 4/2008 | Menon et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0123687 A1 | 5/2008 | Bangalore et al. |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1* | 6/2008 | Allen .................. G06F 16/958 719/316 |
| 2008/0149921 A1 | 6/2008 | Choi et al. |
| 2008/0162343 A1 | 7/2008 | Bedier |
| 2008/0177627 A1 | 7/2008 | Cefail |
| 2008/0177630 A1 | 7/2008 | Maghfourian et al. |
| 2008/0208974 A1 | 8/2008 | Belimpasakis |
| 2008/0235085 A1 | 9/2008 | Kovinsky et al. |
| 2008/0250445 A1 | 10/2008 | Zigmond et al. |
| 2008/0255934 A1 | 10/2008 | Leventhal et al. |
| 2008/0276266 A1 | 11/2008 | Huchital et al. |
| 2008/0281685 A1 | 11/2008 | Jaffe et al. |
| 2008/0294694 A1 | 11/2008 | Maghfourian et al. |
| 2008/0296568 A1 | 12/2008 | Ryu et al. |
| 2008/0306999 A1 | 12/2008 | Finger et al. |
| 2008/0307310 A1 | 12/2008 | Segal et al. |
| 2008/0319852 A1 | 12/2008 | Gardner et al. |
| 2008/0319856 A1 | 12/2008 | Zito et al. |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0032809 A1 | 2/2009 | Kim et al. |
| 2009/0043674 A1 | 2/2009 | Minsky et al. |
| 2009/0077598 A1 | 3/2009 | Watson et al. |
| 2009/0083815 A1 | 3/2009 | McMaster et al. |
| 2009/0094339 A1* | 4/2009 | Allen .................. H04L 67/1095 709/206 |
| 2009/0119169 A1 | 5/2009 | Chandratillake et al. |
| 2009/0125571 A1 | 5/2009 | Kiilerich et al. |
| 2009/0132349 A1 | 5/2009 | Berkley et al. |
| 2009/0157500 A1 | 6/2009 | Ames et al. |
| 2009/0158322 A1 | 6/2009 | Cope et al. |
| 2009/0199230 A1 | 8/2009 | Kumar et al. |
| 2009/0210790 A1 | 8/2009 | Thomas |
| 2009/0248546 A1 | 10/2009 | Norris et al. |
| 2009/0259563 A1 | 10/2009 | Ruhnke et al. |
| 2009/0265255 A1 | 10/2009 | Jackson et al. |
| 2009/0276805 A1* | 11/2009 | Andrews, II et al. .......... 725/35 |
| 2009/0319388 A1 | 12/2009 | Yuan et al. |
| 2009/0320073 A1 | 12/2009 | Reisman |
| 2009/0327891 A1 | 12/2009 | Holm et al. |
| 2010/0030578 A1* | 2/2010 | Siddique .................. G06Q 30/06 705/3 |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0169277 A1* | 7/2010 | Shyu .................. H04L 67/104 707/622 |
| 2010/0223107 A1 | 9/2010 | Kim et al. |
| 2010/0247061 A1 | 9/2010 | Bennett et al. |
| 2010/0279766 A1 | 11/2010 | Pliska et al. |
| 2010/0283827 A1 | 11/2010 | Bustamente |
| 2010/0287580 A1 | 11/2010 | Harding et al. |
| 2010/0299616 A1 | 11/2010 | Chen et al. |
| 2010/0306402 A1 | 12/2010 | Russell et al. |
| 2010/0306805 A1 | 12/2010 | Neumeier et al. |
| 2010/0318414 A1 | 12/2010 | Ettala |
| 2010/0332329 A1 | 12/2010 | Roberts et al. |
| 2011/0004517 A1 | 1/2011 | Soto et al. |
| 2011/0045852 A1 | 2/2011 | Kovach |
| 2011/0052144 A1 | 3/2011 | Abbas et al. |
| 2011/0071865 A1 | 3/2011 | Leeds et al. |
| 2011/0133176 A1 | 6/2011 | Lee et al. |
| 2011/0173300 A1 | 7/2011 | Levy et al. |
| 2011/0191809 A1 | 8/2011 | Briggs et al. |
| 2011/0231260 A1 | 9/2011 | Price |
| 2011/0238755 A1 | 9/2011 | Khan et al. |
| 2011/0251897 A1 | 10/2011 | Litvack et al. |
| 2011/0307397 A1 | 12/2011 | Benmbarek |
| 2011/0321096 A1 | 12/2011 | Landow et al. |
| 2012/0030704 A1 | 2/2012 | Schiller et al. |
| 2012/0036048 A1 | 2/2012 | Robb et al. |
| 2012/0079021 A1 | 3/2012 | Roman et al. |
| 2012/0158511 A1 | 6/2012 | Lucero et al. |
| 2012/0185355 A1* | 7/2012 | Kilroy .................. 705/26.8 |
| 2012/0201521 A1 | 8/2012 | Frojdh et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0284607 A1 | 11/2012 | Jones et al. |
| 2012/0296738 A1 | 11/2012 | Leeder |
| 2012/0296739 A1* | 11/2012 | Cassidy .................. H04N 21/8583 705/14.51 |
| 2012/0296782 A1 | 11/2012 | Tsai et al. |
| 2012/0304065 A1 | 11/2012 | Cai |
| 2013/0014137 A1 | 1/2013 | Bhatia et al. |
| 2013/0014155 A1 | 1/2013 | Clarke et al. |
| 2013/0054757 A1 | 2/2013 | Spitz et al. |
| 2013/0110608 A1 | 5/2013 | Cassidy et al. |
| 2013/0117131 A1 | 5/2013 | Robinson et al. |

(56) References Cited

U.S. PATENT DOCUMENTS

| | | | |
|---|---|---|---|
| 2013/0117409 | A1 | 5/2013 | Yang et al. |
| 2013/0144903 | A1 | 6/2013 | Andrews, II et al. |
| 2013/0151352 | A1 | 6/2013 | Tsai et al. |
| 2013/0152123 | A1 | 6/2013 | Briggs et al. |
| 2013/0162655 | A1 | 6/2013 | Mueller |
| 2013/0166382 | A1 | 6/2013 | Cassidy et al. |
| 2013/0174191 | A1 | 7/2013 | Thompson et al. |
| 2013/0183021 | A1 | 7/2013 | Osman |
| 2013/0211891 | A1 | 8/2013 | Daniel et al. |
| 2013/0212611 | A1 | 8/2013 | Van Aacken et al. |
| 2013/0215116 | A1 | 8/2013 | Siddique et al. |
| 2013/0218964 | A1 | 8/2013 | Jakobson |
| 2013/0228615 | A1 | 9/2013 | Gates et al. |
| 2013/0254018 | A1 | 9/2013 | Rao |
| 2013/0290550 | A1 | 10/2013 | Bangalore et al. |
| 2014/0019860 | A1 | 1/2014 | Sathish et al. |
| 2014/0032366 | A1 | 1/2014 | Spitz et al. |
| 2014/0052576 | A1 | 2/2014 | Zelenka et al. |
| 2014/0095330 | A1 | 4/2014 | Briggs et al. |
| 2014/0181208 | A1 | 6/2014 | Robinson et al. |
| 2014/0208235 | A1 | 7/2014 | Robinson et al. |
| 2014/0250211 | A1 | 9/2014 | Spitz et al. |
| 2014/0254942 | A1 | 9/2014 | Liu et al. |
| 2014/0282700 | A1 | 9/2014 | Briggs et al. |
| 2014/0359671 | A1 | 12/2014 | Andrews, II et al. |
| 2015/0073919 | A1 | 3/2015 | Spitz et al. |
| 2015/0074710 | A1 | 3/2015 | Spitz et al. |
| 2015/0074711 | A1 | 3/2015 | Spitz et al. |
| 2015/0092111 | A1 | 4/2015 | Spitz et al. |
| 2015/0095455 | A1 | 4/2015 | Spitz et al. |
| 2017/0195400 | A1 | 7/2017 | Spitz et al. |
| 2018/0018724 | A1 | 1/2018 | Spitz et al. |
| 2019/0349416 | A1 | 11/2019 | Spitz et al. |

FOREIGN PATENT DOCUMENTS

| | | |
|---|---|---|
| CN | 101833721 A | 9/2010 |
| CN | 102160072 A | 8/2011 |
| CN | 102782608 | 11/2012 |
| EP | 1229464 A1 | 8/2002 |
| JP | 2002-007587 | 1/2002 |
| JP | 2002-015208 | 1/2002 |
| JP | 2002-041898 A | 2/2002 |
| JP | 2002-526831 | 8/2002 |
| JP | 2003-530618 | 10/2003 |
| JP | 2004-038694 | 2/2004 |
| JP | 2005-056163 | 3/2005 |
| JP | 2007-020062 | 1/2007 |
| JP | 2007-528051 | 10/2007 |
| JP | 2008-112381 | 5/2008 |
| JP | 2012-186834 A | 9/2012 |
| JP | 2012-527702 | 11/2012 |
| KR | 100824197 B1 | 4/2008 |
| KR | 10-2009-0043730 | 5/2009 |
| KR | 10-2010-0048734 | 5/2010 |
| WO | WO 2001/009756 | 2/2001 |
| WO | WO 01/91869 | 12/2001 |
| WO | WO 2003/104931 | 12/2003 |
| WO | WO 2005/036875 | 4/2005 |
| WO | WO 2005/039131 | 4/2005 |
| WO | WO 2008/102223 | 8/2008 |
| WO | WO 2008/136846 | 11/2008 |
| WO | WO 2009/079243 | 6/2009 |
| WO | WO 2009/101259 | 8/2009 |
| WO | WO 2010/009281 | 1/2010 |
| WO | WO 2011/149491 | 12/2011 |
| WO | WO 2013/033239 | 3/2013 |
| WO | WO 2015/013117 | 1/2015 |
| WO | WO 2015/038795 | 3/2015 |
| WO | WO 2015/038798 | 3/2015 |
| WO | WO 2015/038802 | 3/2015 |
| WO | WO 2015/048375 | 4/2015 |
| WO | WO 2015/048377 | 4/2015 |
| WO | WO 2015/054644 | 4/2015 |

OTHER PUBLICATIONS

International Search Report dated Nov. 24, 2014 in connection with International Application No. PCT/US14/55233; 2 pages.
Written Opinion of International Searching Authority dated Nov. 24, 2014 in connection with International Application No. PCT/US14/55233; 3 pages.
International Search Report dated Dec. 15, 2014 in connection with International Application No. PCT/US14/57595; 2 pages.
Written Opinion of International Searching Authority dated Dec. 15, 2014 in connection with International Application No. PCT/US14/57595; 3 pages.
International Search Report dated Dec. 16, 2014 in connection with International Application No. PCT/US14/55226; 2 pages.
Written Opinion of International Searching Authority dated Dec. 16, 2014 in connection with International Application No. PCT/US14/55226; 4 pages.
International Search Report dated Dec. 16, 2014 in connection with International Application No. PCT/US14/55229; 2 pages.
Written Opinion of International Searching Authority dated Dec. 16, 2014 in connection with International Application No. PCT/US14/55229; 4 pages.
International Search Report dated Jan. 9, 2015 in connection with International Application No. PCT/US14/57597; 2 pages.
Written Opinion of International Searching Authority dated Jan. 9, 2015 in connection with International Application No. PCT/US14/57597; 4 pages.
Non-Final Office Action dated Oct. 2, 2014 in connection with U.S. Appl. No. 12/434,569; 11 pages.
Non-Final Office Action dated Dec. 18, 2014 in connection with U.S. Appl. No. 14/484,047; 8 pages.
Non-Final Office Action dated Dec. 19, 2014 in connection with U.S. Appl. No. 14/484,065; 8 pages.
Non-Final Office Action dated Dec. 26, 2014 in connection with U.S. Appl. No. 14/484,225; 8 pages.
Non-Final Office Action dated Jan. 9, 2015 in connection with U.S. Appl. No. 14/292,423; 14 pages.
Office Action for U.S. Appl. No. 12/363,713, dated Oct. 3, 2011.
Office Action for U.S. Appl. No. 12/363,713, dated Jun. 13, 2012.
Office Action for U.S. Appl. No. 14/079,385, dated Mar. 3, 2015.
Office Action for U.S. Appl. No. 13,753,384, dated Jul. 9, 2014.
Office Action for U.S. Appl. No. 13/753,384, dated Oct. 25, 2013.
Office Action for U.S. Appl. No. 13/753,384, dated Dec. 20, 2013.
Office Action for Australian Application No. 2012302021, dated Oct. 22, 2015, 3 pages.
Notice of Acceptance for Australian Application No. 2012302021, dated May 4, 2016, 2 pages.
First Office Action for Chinese Application No. 201280053145.7, dated Mar. 1, 2016, 3 pages.
Supplementary European Search Report for European Application No. 12828677.0, dated Sep. 28, 2015, 7 pages.
Office Action for Russian Application No. 2014112353, dated Feb. 18, 2016, 2 pages.
International Search Report and Written Opinion for International Application No. PCT/US2012/052897, dated Nov. 14, 2012.
Office Action for Canadian Application No. 2,877,567, dated Feb. 29, 2016, 5 pages.
International Search Report and Written Opinion for International Patent Application No. PCT/US2013/047124, dated Jan. 10, 2014.
Office Action for U.S. Appl. No. 14/497,686, dated Feb. 24, 2015.
Office Action for U.S. Appl. No. 14/498,800, dated Mar. 27, 2015.
Notification on Results of Estimation of Patentability of Invention dated Feb. 16, 2015 for Russian Patent Application No. 2012105917/08(009063); 7 pages.
Lob, S. et al., "NEMO—The Network Environment for Multimedia Objects," ACM, IITM '10 Proceedings of the First International Conference on Intelligent Interactive Technologies and Multimedia, ISBN 978-14503-0408-5, pp. 245-249 (2010) http://doi.acm.org/10.1145/1963564.1963607.
MediaTomb, MediaTomb Scripting [online], Retrieved on Oct. 11, 2015, URL: http://mediatomb.cc/pages/scripting, 24 pages.
Morin, J-H et al., "HyperNews: a commercial electronic newspaper," pp. 147-163 (Nov. 8, 2004).

(56) References Cited

OTHER PUBLICATIONS

Office Action for Japanese Application No. 2015-518618, dated Jul. 25, 2017, 7 pages.
Office Action for Russian Application No. 2015101757, dated Jun. 20, 2017, 2 pages
Masuko, S. et al., "KiTeMiROOM: Fashion Coordinate System for Online Shopping," IPSJ Interaction 2012, Information Processing Society of Japan, Mar. 31, 2012, pp. 807-812 (with English Abstract).
Second Office Action for Chinese Application No. 201280053145.7, dated Aug. 16, 2016, 3 pages.
Office Action for European Application No. 12828677.0, dated Sep. 14, 2016, 7 pages.
Office Action for Japanese Application No. 2014-528557, dated Jul. 26, 2016, 2 pages.
Office Action for Mexican Application No. MX/a/2014/002490, dated Jun. 10, 2016, 7 pages (machine translation only).
Examination Report No. 1 for Australian Application No. 2016216565, dated Jul. 13, 2017, 2 pages.
First Office Action for Chinese Application No. 201380043181.X, dated Mar. 31, 2017, 15 pages (English Translation).
Office Action for Mexican Application No. MX/a/2014/015947, dated Mar. 2, 2016, 3 pages (English Summary).
Office Action for Mexican Application No. MX/a/2014/015947, dated Oct. 11, 2016, 6 pages (No Translation Available).
Supplementary European Search Report for European Application No. 14852427.5, dated Apr. 20, 2017, 5 pages.
Office Action for Canadian Application No. 2,847,262, dated Jul. 4, 2018, 4 pages.
Office Action for U.S. Appl. No. 15/234,863, dated Oct. 18, 2017, 9 pages.
Examination Report No. 1 for Australian Application No. 2013277992, dated Nov. 23, 2017, 3 pages.
Second Office Action for Chinese Application No. 201380043181.X, dated Nov. 24, 2017, 15 pages.
Office Action for European Application No. 13806161.9, dated Feb. 6, 2019, 11 pages.
First Office Action for Chinese Application No. 201480055045.7, dated Jan. 17, 2019, 9 pages.
Notice of Reasons for Rejection for Japanese Application No. 2016-547982, dated Jun. 21, 2018, 4 pages.
Notice of Reasons for Rejection for Japanese Application No. 2016-547982, dated Apr. 18, 2019, 6 pages.
Office Action for U.S. Appl. No. 15/443,397, dated Nov. 29, 2018, 11 pages.
Wikipedia, "Content delivery network," [Online], Mar. 24, 2008, Retrieved from the Internet: <URL: http://en.wikipedia.org/w/index.php?title=Content_delivery_network&oldid=601009970>, Retrieved on Nov. 17, 2014, 8 pages.
Examination Report No. 1 for Australian Application No. 2014331699, dated May 31, 2019, 4 pages.
Office Action for Canadian Application No. 2,847,262, dated Jun. 19, 2019, 4 pages.
Extended European Search Report for European Application No. 18198927.8, dated Apr. 15, 2019, 10 pages.
Office Action for Indian Application No. 2406/CHENP/2014, dated Dec. 31, 2019, 7 pages.
First Office Action for Chinese Application No. 201710274249.5, dated Dec. 31, 2019, 16 pages.
Notice of Preliminary Rejection for Korean Application No. 10-2019-7022867, dated Sep. 10, 2019, 5 pages.
Office Action for U.S. Appl. No. 16/215,138, dated Sep. 18, 2019, 8 pages.
First Examination Report for Indian Application No. 11073/DELNP/2014, dated Feb. 20, 2020, 9 pages.
Second Office Action for Chinese Application No. 201480055045.7, dated Sep. 18, 2019, 23 pages.
Notice of Preliminary Rejection for Korean Application No. 10-2015-7001303, dated Nov. 28, 2019, 14 pages.
Office Action for Australian Application No. 2019201260, dated Nov. 20, 2019, 4 pages.

* cited by examiner

APPARATUS AND METHOD FOR PEER-ASSISTED E-COMMERCE SHOPPING

CROSS-REFERENCE TO RELATED APPLICATION AND PRIORITY CLAIM

The present application is a continuation-in-part of U.S. patent application Ser. No. 13/923,089, entitled "PEER-ASSISTED SHOPPING" filed on Jun. 20, 2013, which claims priority to U.S. Patent Application Ser. No. 61/662,765, entitled "PEER-ASSISTED SHOPPING" filed on Jun. 21, 2012. application Ser. No. 13/923,089 is assigned to the assignee of the present application and the above applications are hereby incorporated by reference into the present application as if fully set forth herein. The present application hereby claims priority under 35 U.S.C. § 120 to U.S. patent application Ser. No. 13/923,089, which claims priority to U.S. Patent Application Ser. No. 61/662,765. The present application also hereby claims priority under 35 U.S.C. § 119(e) to U.S. Provisional Patent Application No. 61/889,377 filed on Oct. 10, 2013 entitled "E-COMMERCE SHOPPING" and U.S. Provisional Patent Application No. 61/889,330 filed on Oct. 10, 2013 entitled "E-COMMERCE SHOPPING." The content of the above-identified patent documents is incorporated herein by reference.

TECHNICAL FIELD

This disclosure is directed generally to software and more specifically to an apparatus and method for peer-assisted e-commerce shopping.

BACKGROUND

When shopping on the Internet, buyers lose some ability to bring friends with them to help with their purchases. Having friends come shopping gives a buyer more confidence in making purchases. When friends are not available for comment, a buyer may decide not to buy an item and wait until a later point in time to make a purchase.

SUMMARY

This disclosure provides an apparatus and method for peer-assisted e-commerce shopping.

In a first embodiment, a method for peer-assisted shopping including receiving, at a first device, a transacting media container comprising base content and supplemental content related to one or more items in the base content. The method also includes receiving a selection of at least one of the one or more items. The method also includes initiating a first shopping cart within the transacting media container of the first device, the first shopping cart identifying the at least one selected item. The method also includes establishing a communication channel with a second device. The method also includes transmitting information to synchronize a second shopping cart associated with the second device with the first shopping cart.

In a second embodiment, an apparatus includes a memory and a processing device. The memory stores a transacting media container. The transacting media container including base content and supplemental content related to one or more items in the base content. The processing device receives initiates a first shopping cart within the transacting media container of the first device, the first shopping cart identifying the at least one selected item. The processing device also includes establishes a communication channel with a second device. The processing device also includes transmits information to synchronize a second shopping cart associated with the second device with the first shopping cart.

In a third embodiment, a non-transitory computer-readable medium includes logic stored on the computer-readable medium. The logic, when executed, causes the processing device to receive, at a first device, a transacting media container comprising base content and supplemental content related to one or more items in the base content. The logic, when executed, causes the processing device to also receive a selection of at least one of the one or more items. The logic, when executed, causes the processing device to also initiate a first shopping cart within the transacting media container of the first device, the first shopping cart identifying the at least one selected item. The logic, when executed, causes the processing device to also establish a communication channel with a second device. The logic, when executed, causes the processing device to also transmit information to synchronize a second shopping cart associated with the second device with the first shopping cart.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

Figure 1:
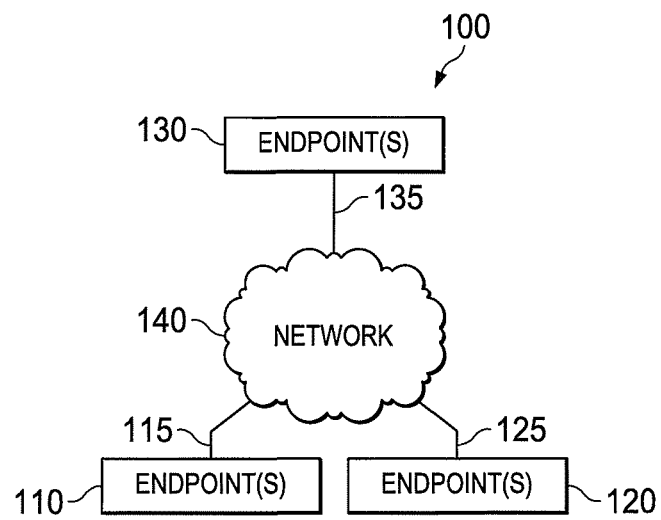
FIG. 1 illustrates an example communication system that can be utilized to facilitate communication between endpoints through a communication network according to this disclosure.

FIG. 1 illustrates an example communication system 100 that can be utilized to facilitate communication between endpoints through a communication network according to this disclosure. As shown in FIG. 1, the system 100 includes various endpoints 110, 120, and 130. In this document, the term "endpoint" generally refers to any device, system, or other structure that communicates with another endpoint. Example endpoints 110, 120, and 130 include but are not limited to servers (such as application servers and enterprise servers), desktop computers, laptop computers, netbook computers, tablet computers (such as APPLE IPADs), switches, mobile phones (such as IPHONE and ANDROID-based phones), networked glasses (such as GOOGLE GLASS), networked televisions, networked disc players, components in a cloud-computing network, or any other device or component suitable for communicating information to and from a communication network. Endpoints 110, 120, and 130 may support Internet Protocol (IP) or any other suitable communication protocol(s). Endpoints 110, 120, and 130 may additionally include medium access control (MAC) and physical layer (PHY) interfaces, such as those that conform to the IEEE 701.11 standard. An endpoint 110, 120, and 130 can have a device identifier, such as a MAC address, and may have a device profile that describes the endpoint.

A communication network 140 facilitates communications between the endpoints 110, 120, and 130. Various links 115, 125, and 135 couple the endpoints 110, 120, and 130 to the communication network 140. The communication network 140 and associated links 115, 125, and 135 may include but are not limited to a public or private data network, a telephony network, a local area network (LAN), a metropolitan area network (MAN), a wide area network (WAN), a wireline or wireless network (such as GSM, CDMA, LTE, WIMAX, 5G, or the like), a local/regional/global communication network, portions of a cloud-computing network, a communication bus for components in a system, an optical network, a satellite network, an enterprise intranet, or any other communication links or combinations of the preceding. In particular embodiments, portions of the links 115, 125, 135 or the communication network 140 may be on or form a part of the Internet.

Although the endpoints 110, 120, and 130 generally appear as being in a single location in FIG. 1, various endpoints may be geographically dispersed, such as in cloud computing scenarios. Also, each endpoint could represent a fixed or mobile device. When the endpoints 110, 120, and 130 communicate with one another, any of a variety of security schemes may be utilized. As an example, in particular embodiments, the endpoints 110 and 120 may represent clients, and the endpoint(s) 130 may represent one or more servers in a client-server architecture. The server(s) may host a website, and the website may have a registration process whereby a user establishes a username and password to authenticate or log into the website. The website may additionally utilize a web application for any particular application or feature that may need to be served up to the website for use by the user. Additionally, in particular configurations, the communication between the endpoints 110 and 120 may be facilitated using a communication path through the endpoint 130.

Various embodiments described in this patent document may benefit from and/or utilize SMART CONTAINER technology from CINSAY, INC., which is briefly described below and is described more fully in U.S. Pat. No. 8,769,053 (which is hereby incorporated by reference in its entirety). This technology provides an innovative way for merchants to reach their customers online. In the traditional online sales model, merchants need to create search or display ads that show up when online consumers visit search engine sites or various web properties. If a consumer sees an interesting ad related to a product or service, the consumer needs to leave his or her current activity and visit some other web destination to discover more information or make an online purchase. Consumers have specific online behavior patterns. If consumers are actively shopping, the traditional multistep model is workable. The traditional advertising sales model requires that a consumer stop what he or she is doing and visit some other online destination. However, if consumers are on social sites interacting with friends, reading the news, playing games, or engaging in other online activities, they are much less likely to leave their current activities to visit some external Internet destinations.

The SMART CONTAINER model brings product information or a store to the consumer. The SMART CONTAINER code/technology virally syndicates across the web, for example, using components described with reference to FIGS. 1 and 5 or using other components. It is ideal for those types of destinations that online consumers tend to frequent, such as social networks and blogs. Regardless, if the SMART CONTAINER code is located on a web page, a blog article, a social network page or wall, or a mobile device, a consumer can complete a transaction right there with no need to be diverted to some external destination.

SMART CONTAINER objects are intelligent Internet objects that virally syndicate and propagate across the web and other connected networks and mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

SMART CONTAINER code is normally configured with a video player window, a selection of products or services being offered, and a variety of related video clips. This collection of video clips allows a consumer to learn more about the products or services being offered. The consumer can select any of these offered items to get more details, all enclosed within the SMART CONTAINER technology.

The offered items (products or services) may be items being advertised or sold. Depending on the type, the SMART CONTAINER code may allow a consumer to request to be contacted, or even purchase the object, right there. The consumer need not leave his or her current activity or web page. Offered items could also include or be associated with discounts or coupons. They may even be an opportunity to donate to a charity or political campaign. Of course, sometimes it does make sense to visit another Internet designation, and if appropriate the consumer can certainly be linked there as well.

Because the SMART CONTAINER code handles all the complexity, it can turn the simplest website into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, supplemental items in the SMART CONTAINER code called ON-DEMAND merchandise can be offered. Merchants can custom design a selection of apparel with their art and graphics to be sold along with their own creations. ON-DEMAND fulfillment dynamically produces and ships their custom apparel for them, eliminating the need to manage inventory and providing their online customers with a richer line of products. Of course, because their instant e-commerce stores are based on SMART CONTAINER objects, it can also propagate out onto all forms of viral syndication methods as well.

The SMART CONTAINER code is also auto-customizing according to particular configurations. If a device is a traditional personal computer (PC) or laptop, it will render using optimal technology, which for this purpose could represent FLASH. On mobile devices such as IPHONEs, IPADs, or ANDROID phones, this means HTML5 or a native interactive app will likely get used. The items in the SMART CONTAINER code also know about each other according to particular configurations. When a video is playing, a container can update product and service objects being shown that correspond with the particular sequence in a video segment. It allows a "mini QVC" shopping channel to be created and syndicated across the Internet. Beyond device type, there are other dimensions of customization. Smaller devices and some environments such as social sites restrict window sizes, so the SMART CONTAINER code adapts. In addition, it may be appropriate to provide different content based on geolocation, so the SMART CONTAINER code can customize for these, as well.

The SMART CONTAINER code virally syndicates across the Internet following the more popular network paths. SMART CONTAINER objects can be hosted on traditional web pages or blogs, contained in emails, operate on mobile devices, or propagate social networks. Because the SMART CONTAINER code is flexible, it can also be set up in the form factor of a display ad unit and distributed via ad servers on display advertising networks. When the code exists on social networks like FACEBOOK, it can ride the wave of user "likes." For example, if a woman shopper likes some great shoes shown in a SMART CONTAINER object interface, the SMART CONTAINER object can propagate directly to their "wall." Now all of her friends see the SMART CONTAINER object and can view or transact right there on their own walls. Of course, if any of her friends also "like" it, the SMART CONTAINER object propagates and rides the wave further out into that branch of the social network, yielding a potential exponential growth factor. The container does not necessarily involve products like shoes. As another example, a container can support a politician running for office. His or her supporters may be passionate about a message and "like" it, again making it available to their networks. Now, similarly-minded political supporters can view those messages and, if so moved, donate to the cause. Yet another example is sports. In this case, a sports fan may wish to watch content on his or her high-definition (HD) large screen television. More and more users have interconnected devices such as ROKU and CHROMECAST devices, and the SMART CONTAINER code may be sent to such IP television boxes, as well.

When merchants launch and syndicate their SMART CONTAINER objects onto the Internet, they want to know how their campaigns are performing. SMART CONTAINER objects report back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop a marketing or sales campaign.

Another form of tracking relates to how the SMART CONTAINER code is propagated. A merchant may wish to use affiliates to help syndicate them and pay them a percentage based on the transactions resulting from their work. SMART CONTAINER objects can be tagged with affiliate tracking identifiers, allowing status reports and transactions from container instances or their descendants to be properly filtered. Another tracking usage may be for a politician to assign affiliate codes to his or her supporters and be able to measure whose efforts result in the most new supporters.

SMART CONTAINER objects are designed to be highly scalable according to particular configurations. Rather than burden a single website with massive traffic (which would result from a traditional model of bringing all consumers to a store), SMART CONTAINER code operates in a distributed manner. For example, the SMART CONTAINER code can execute where it is located, such as on a blog, a social network, or a mobile device. SMART CONTAINER objects fetch their instructions when started and then gather their product items and video streams from a worldwide distributed content delivery network. This results in a highly scalable architecture, allowing millions of concurrent consumers.

By bringing the store to the customer, the SMART CONTAINER code enables many new ways for merchants to connect with their consumers without disrupting the consumers' web activities. The end result is to connect the consumers directly with the merchants, eliminating the middleman and promoting a much more natural shopping experience.

Figure 10:
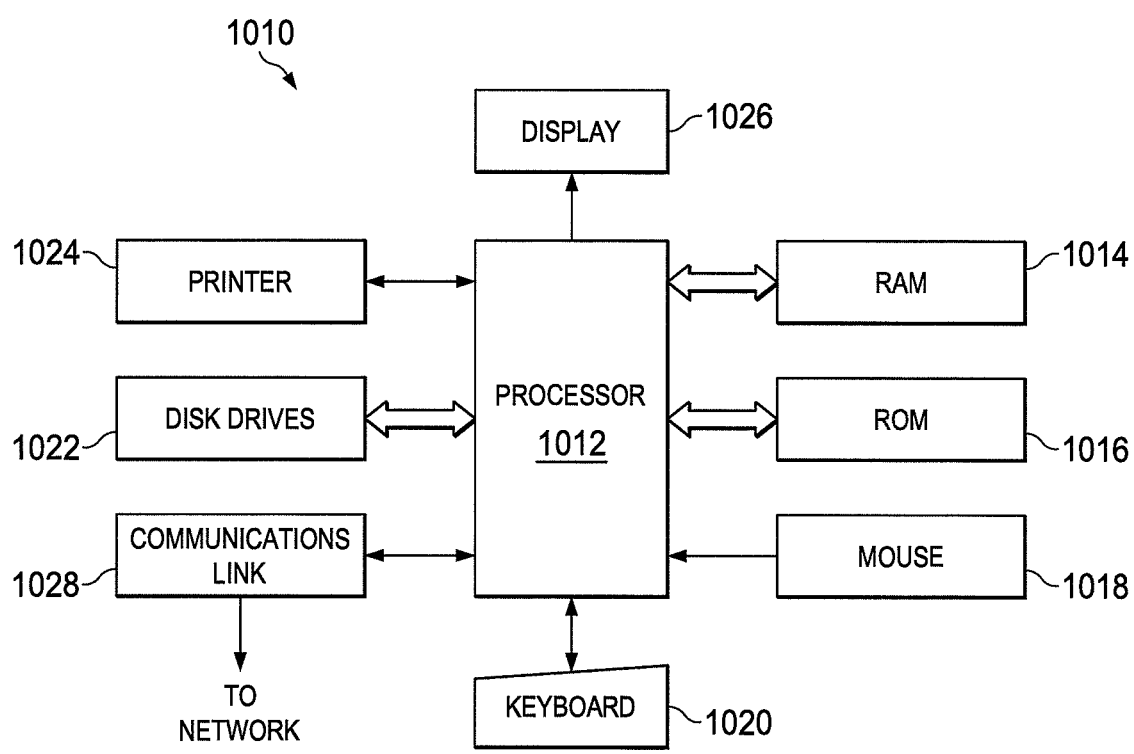
FIG. 10 illustrates an example computing device supporting peer-assisted e-commerce shopping according to this disclosure.

The functionality of the above description may avail from any suitable components, such as those described in FIGS. 1 and 10 or other suitable components. The code itself may be written in any suitable format, including but not limited to Java, C++, C-sharp, HTML, HTML5, JAVA SCRIPT, PYTHON, RUBY, and the like.

There exists a variety of content in the world that is independent—existing separate from any special containers such as that invoked by Cinsay Smart Container™ code. Certain embodiments of the disclosure seek to harness the power of such content by dynamically binding supplemental content to the underlying base content. As a simple example, a video may be streamed from a content server such as provided by one of many video streaming services. The base content represents any type of visual or audio content—be it a picture, a streaming video, a live stream from a remote location, real-time content from the current location of a device, a web page, or other types of visual content. The supplemental content represents additional information related to the base content and/or a user accessing the base content. According to certain embodiments of disclosure, supplemental content represents additional information related to the base content and/or a user accessing the base content. A co-pending provisional application No. 61/876,668 filed Sep. 11, 2013 and entitled DYNAMIC BINDING OF INTELLIGENT INTERNET OBJECTS (which is hereby incorporated by reference) discloses the addition of such supplemental content. A co-pending provisional application No. 61/876,647 filed Sep. 11, 2013 and entitled AD-HOC DYNAMIC BINDING OF INTELLIGENT INTERNET OBJECTS (which is hereby incorporated by reference) discloses the manner of selecting what supplemental content to display.

Figure 2A:
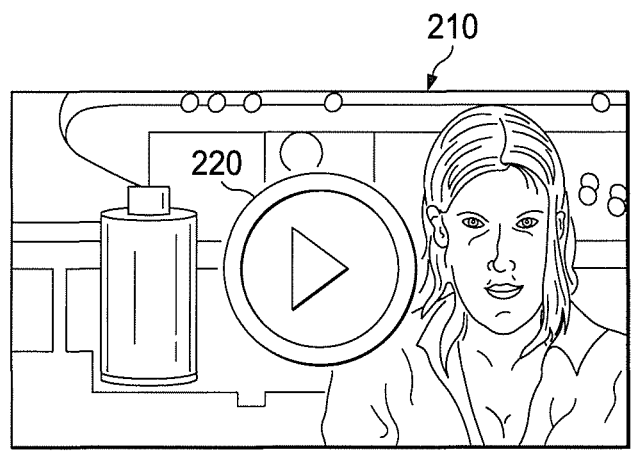
FIGS. 2A through 2C illustrate how an example content container is enhanced for peer-assisted shopping according to this disclosure.
Figure 2B:
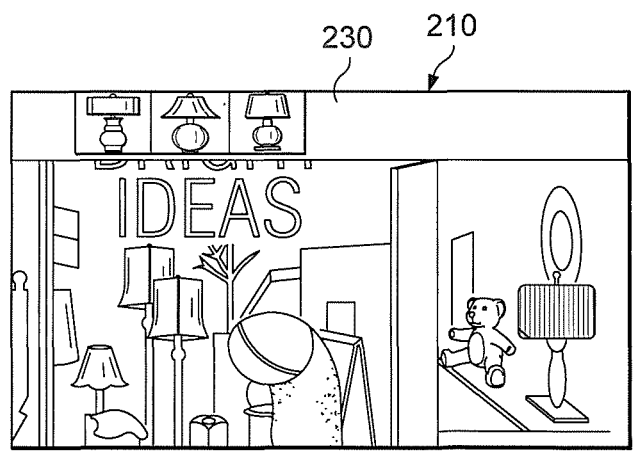
Figures 2C, 3:
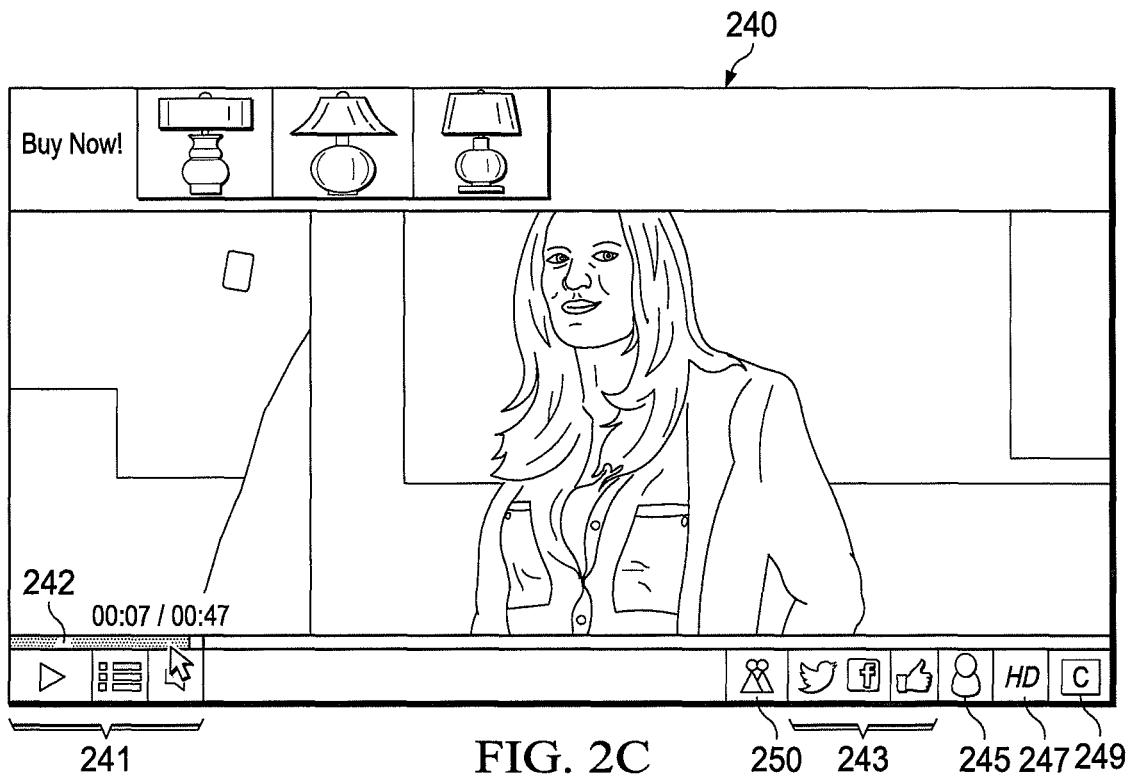
FIG. 3 illustrates an example interface for initiating contact between endpoints to support peer-assisted shopping according to this disclosure.

FIGS. 2A through 2C illustrate how an example content container (such as a SMART CONTAINER or other container) is enhanced for peer-assisted shopping according to this disclosure. In accordance with some embodiments of this disclosure, the concept of shopping with friends or family is emulated. Specifically, the person with whom a user is shopping need not be physically present. However, the user is able to communicate and solicit feedback from such a person as though they were shopping together. As discussed below, a "peer" in particular embodiments may be person known by the user, such as a friend or family member. In other embodiments, a "peer" may be a person who is not readily known to the user.

With reference to FIGS. 2A and 2B, a container 210 is shown. In this container 210, viewable base content includes at least one video (as indicated by a play button 220). However, in other configurations, the container 210 may include images, live-video feeds, or any other type(s) of base content. The base content could be obtained from any suitable source. As examples, the base content may be a video streamed through a video-based provider, such as YOUTUBE, VIMEO, NETFLIX, REDBOX INSTANT or others, being viewed on a computer, a mobile device, a television screen, or any other suitable device or devices. The base content may also be a real-time view of content at a current location being viewed through an electronic device such as GOOGLE GLASS or a real-time view in a mobile computing device such as a tablet or phone. In yet other configurations, the base content may be an image. In still other configurations, the base content may be a web page.

In FIG. 2B, the video has been initiated, and a selectively displayable product carousel 230 with multiple products is shown. In particular configurations, these products correspond to one or more products or services being shown in the content within the underlying container (a video here), although this need not be the case. While shown as overlaying a top portion of the video, the product carousel 230 may overlay other portions of the video (such as a side or bottom portion of the video) or not overlay the video at all. For example, the product carousel 230 may extend from or be positioned outside of the container 210. Additionally, varying degrees of transparency may be used in the product carousel 230, or the product carousel 230 may be opaque.

A user viewing the container 210 may interact with the product carousel 230 and purchase items or perform other transactions without leaving the container 210. For example, with reference to a container on a FACEBOOK wall of a friend, a user may purchase the product directly from the container 210 for such items. In other configurations, a user may leave the container 210 and be redirected to a website.

With reference to FIG. 2C, additional features of the container 210 are shown. For example, a selectively displayable toolbar 240 is shown at least partially overlaying a bottom of the container 210. Although shown overlaying the bottom portion of the video, the toolbar 240 may overlay other portions of the video (such as a side or bottom portion of the video) or not overlay the video at all. For example, the toolbar 240 may extend from or be positioned outside of the container 210. Additionally, varying degrees of transparency may be used in the toolbar 240, or the toolbar 240 may be opaque.

A variety of options are provided in the toolbar 240, including play and audio options 241, share options 243, account login options 245, video quality options 247, and further information options 249. The functionality of the play and audio options 241 are apparent to one of ordinary skill in the art. Also shown is a play bar 242, which is apparent to one of ordinary skill in the art. In particular configurations, the play bar 242 may replace a play bar that would otherwise co-exist for a display of the base content.

Upon clicking on the share options 243, a variety of other options may be provided. For example, a user may be given the opportunity to share the container via networks such as FACEBOOK, MYSPACE, TWITTER, YAHOO, LINKEDIN, GOOGLE, INSTAGRAM, or WORDPRESS. Furthermore, the user may be given the option to copy embed codes and share via email. Additionally, the user may be able to propagate the container by clicking the "like" thumb or "+1"ing on GOOGLE PLUS. The account login options 245 may allow a user to sign into a variety of networks including, for example, CINSAY, FACEBOOK, or GOOGLE. The video quality options 247 allow modification of the video, and the further information options 249 can provide any of a variety of options one may wish to provide about the container.

A peer-assisted shopping option 250 is also provided to allow communication with one or more other endpoints. For example, in particular embodiments, a user may be shopping at home on his or her computer, tablet, or television. Upon seeing something he or she likes, the user can select the peer-assisted shopping option 250 to initiate a communication session with a peer. The selection may also be made by eye-tracking components by selecting items that the user is looking at. As another example, a user may be shopping at a store, see a particular item he or she likes, initiate a communication session with a peer using the peer-assisted shopping option 250, and share what he or she is viewing (such as by using camera capture features on a mobile device like a phone, tablet, or GOOGLE GLASS). The selection of the peer-assisted shopping option 250 could occur using a mouse pointer, a finger, or a stylus. Alternatively, activations may occur with certain movement detected by sensors in the device or through voice activation.

Additional details regarding the use of the peer-assisted shopping option 250 are provided below. Again, although the underlying content for the container is often described as a video, the underlying content may include any other content, including (but not limited to) just-taken pictures and real-time video feeds.

FIG. 3 illustrates an example interface 300 for initiating contact between endpoints to support peer-assisted shopping according to this disclosure. For example, upon selected the peer-assisted shopping option 250 in FIG. 2C, the interface 300 may be displayed to a user. In particular configurations, the interface 300 may be transparently displayed over a container.

In the interface 300, connection options 310 represent options for the user to connect with someone who is currently connected a network, such as a CINSAY, FACEBOOK, GOOGLE+, or video chatting network (like SKYPE). If the user is not connected to a particular network, the connection options 310 for that particular network may not be presented or may not be selectable in the connection options 310. When a particular connection option 310 is selected, a message may be propagated through the appropriate network asking the recipient to join the requestor in peer-assisted shopping. Upon accepting the request, the receiving user may be taken to a container interface.

Connection options 320 represent other manners of initiating contact with a person. Example connection options 320 here include using short-messaging-service (SMS) or e-mail. In these options, a link may be provided to a container interface.

When a container is instantiated, the container determines the endpoint's environment and communication options. For example, the container may determine whether video chat is available, whether the bandwidth on the network is appropriate for certain communication techniques, whether Voice over Internet Protocol (VoIP) chatting is an option, whether text chatting is an option, and whether mobile phone access is available (such as by using a carrier like AT&T, VERIZON, SPRINT, or T-MOBILE). In particular embodiments, a person may have multiple devices, and a connection request can be sent in parallel to the multiple devices.

Note that the method and/or manner of communicating between endpoints is virtually limitless. Non-limiting examples of communication channels are provided above with reference to FIG. 1. Any of these communications or others may be utilized for initiating communication between end users.

Moreover, the people listed in the interface 300 can be identified in any suitable manner. For example, the people could be identified using contacts on a device associated with an endpoint or contacts within a network. In particular embodiments, only contacts that are currently connected to a network that is common to the user (such as FACEBOOK, GOOGLE+, CINSAY, or others) may be shown as options. In other examples, a general list of contacts can be shown.

The following are non-limiting examples of ways in which communications can occur between two end-users: short messaging service, online presence, a join-me link that displays in whatever interface a user may currently be using, an email, a blast of messages to a group, or messages to specific friends. In particular embodiments, no account is needed, and a specific linkage between two endpoints is established through connection parameters. As will be recognized by one of ordinary skill in the art, in some embodiments, communications may be direct (peer-to-peer) or indirect (such as through servers that relay messages). In other examples, the communications may be a hybrid of the two.

The following are non-limiting examples of methods by which end users can communicate with one another: VoIP, video chat, text chat, or phone calls. Such communications are in addition to content (such as digital content) that may be shared between the end users. In particular embodiments, the manner of communication may be dependent on the capabilities of the particular devices used by the end users.

Figure 4:
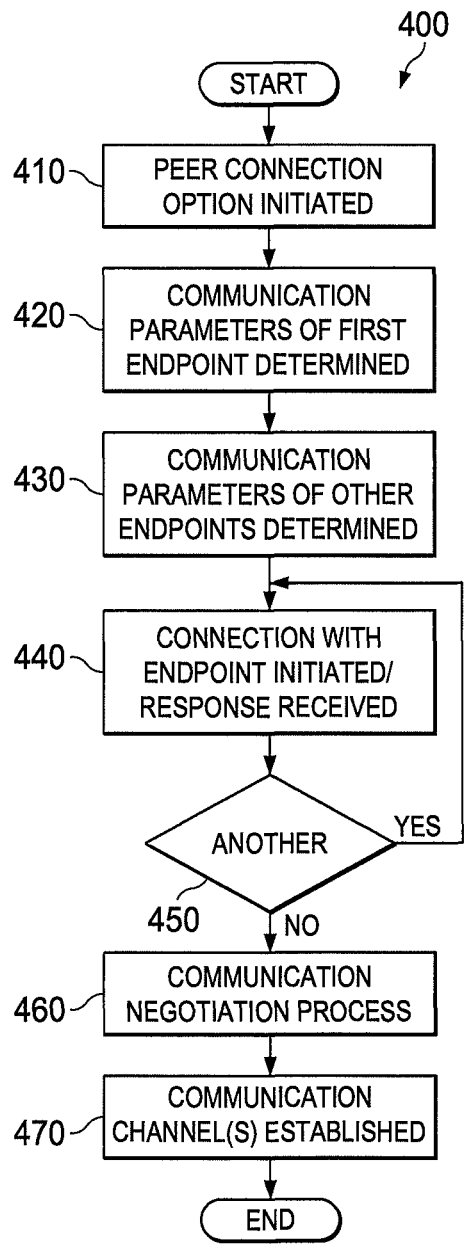
FIGS. 4 and 5 illustrate example processes for establishing communication between different endpoints according to this disclosure.
Figure 5:
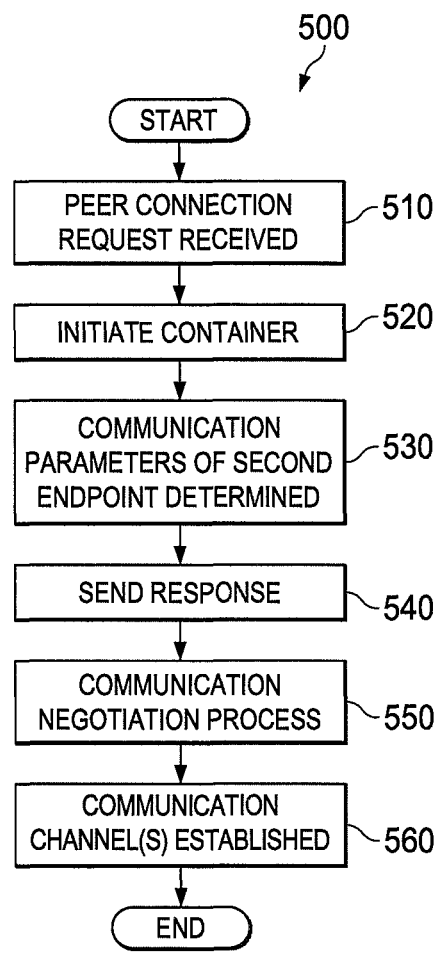

FIGS. 4 and 5 illustrate example processes for establishing communication between different endpoints according to this disclosure. In particular, FIG. 4 shows an example process 400 on a first endpoint that initiates a communication session, while FIG. 5 shows an example process 500 on a second endpoint that receives a request for a communication session. Each process 400, 500 may, for example, be performed by at least one processing device 1012 as shown in FIG. 10 and described below. In the following description, the at least one processing device 1012 is referred to as a controller, although each process 400, 500 could be performed by any other suitable device.

With reference to FIG. 4, the process 400 at the first endpoint begins at step 410 with a controller initiating a peer connection option. As referenced above, this may include a user selecting the peer-assisted shopping option 250 via a mouse click, a tap by a finger on a part of screen, eye-tracking, a stylus touching a screen, a remote for a networked television, voice activation, or a sensor such as proximity detector (such as detecting a wave). Any other suitable activation techniques could also be used.

At step 420, the controller determines communication parameters of the first endpoint. According to particular configurations, this may include determining the methods of communication available on the first endpoint (such as determining whether voice, chat, or video are available) and the nature of such channels (such as bandwidth or type of connection, like WIFI, 3G, 4G, etc.). This may also include determining which networks the first endpoint is currently connected to (such as CINSAY, FACEBOOK, or GOOGLE networks). In particular configurations, a user of a device may configure or control the available method(s) of communication, such as by specifying that video chat is available only if connected via WI-FI (otherwise video chat is turned off).

At step 430, the controller determines available communication parameters of other potential endpoints. According to particular configurations, this may include determining which networks one or more peers are currently connected to (such as CINSAY, FACEBOOK, or GOOGLE networks). This may also include determining what methods of communication are available for each peer. For example, as reference above, a particular person may have multiple devices, and it may not be clear which device or device (if any) the person is currently using. When considering peers, multiple different devices for a single person may be considered. In particular configurations, a user may also be prompted to enter communication parameters. For example, the user may want to communicate with a particular friend and enter the friend's telephone number for an SMS message.

At step 440, the controller initiates communications with at least a second endpoint upon receiving a response from that second endpoint. In particular configurations, messages may be sent in parallel to a second user (such as in-application messages via FACEBOOK/CINSAY and text messages). If the user is at his or her desktop, the user may prefer to communicate with a desktop computer as opposed to a mobile device.

At step 450, the controller determines whether other messages should go out to other endpoints. In particular configurations, group settings can be used, where the peer-assisted shopping is amongst a group of friends. If there are other connections to be formed, the process returns to step 440.

Otherwise, the process 400 moves to step 460, where there is a negotiation process between the endpoints to determine how communication will occur. In this negotiation, the communication capability of each respective endpoint is considered. The negotiation process may be partially carried out on each respective endpoint. Alternatively, a server can operate as an intermediary for the endpoints, or one endpoint may control the communication setup during the negotiation process. Negotiation is used in particular embodiments because, for example, the second endpoint may only be able to communicate via messaging due a lack of a camera or a microphone. Accordingly, messaging may be determined as a suitable communication technique. In particular configurations, the negotiation process of step 460 may take into consideration other devices and the particular content feed within the container. In particular configurations, the first endpoint can communicate with multiple endpoints using disparate technologies. For example, communication between first and second endpoints may occur via video chatting, whereas communication between the first/second endpoints and a third endpoint may occur via text chatting. Accordingly, the negotiation process may determine how to efficient handle such disparate technologies. At step 470, a respective communication channel is established with each of the respective endpoints using suitable connection parameters.

According to particular embodiments, the process 400 of FIG. 4 may occur quickly, such as within several seconds, depending on the computing power and network latency. In certain configurations, the process 400 may take less than a second. In other configurations, the process 400 may take more than several seconds.

With reference to FIG. 5, the process 500 at a second endpoint begins at step 510 by receiving a peer connection request at the second endpoint. As referenced above, in particular configurations, multiple parallel requests may be sent to a particular user who has multiple devices. Several of these types of messages may be received on a particular endpoint. For example, a text message and an in-app message (such as in a CINSAY, FACEBOOK, or GOOGLE app) may be received. In particular configurations, an end user upon seeing each message can choose to accept the invitation to connect. As non-limiting examples, the end user may click on a link or hit a button that confirms acceptance.

At step 520, a controller initializes a container for the communication. In particular configurations, the container may have features that correspond to a pre-installed application on a device. In other configurations, the container may correspond to application features that are propagated "on the fly" or dynamically, such as by using embed codes.

At step 530, the controller determines communication parameters of the second endpoint. This may include performing actions similar to those described above with reference to step 420 of FIG. 4, except it is performed with reference to the second endpoint. At step 540, a response is sent to the first endpoint, such as to confirm or reject the communication request. If acceptable, at step 550, there is a negotiation process between the endpoints to determine how communication will occur. This is similar to step 460 in FIG. 4, except it is done from the perspective of the second endpoint. At step 560, one or more communication channels are established, which is similar to step 470 of FIG. 4.

In particular embodiments, a second endpoint that receives a request and establishes a link with a first endpoint in the process 500 of FIG. 5 may, in turn, perform the process 400 of FIG. 4 using an "add-a-friend" feature. In such an embodiment, approval may or may not be required by the first endpoint to allow a third endpoint to participate. In repeating the process 400, the negotiation between endpoints may consider the link that has already been established between the first or second endpoint.

Figure 6:
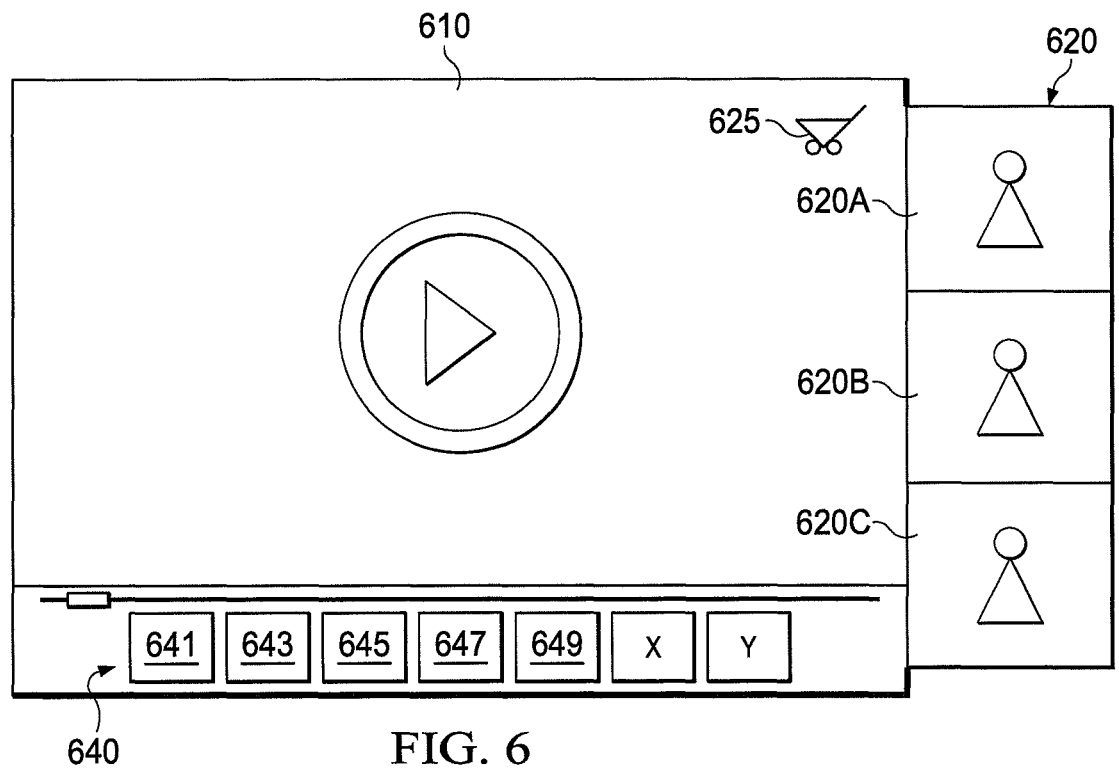
FIGS. 6 and 7 illustrate examples of peer-assisted shopping communication interfaces according to this disclosure.
Figure 7:
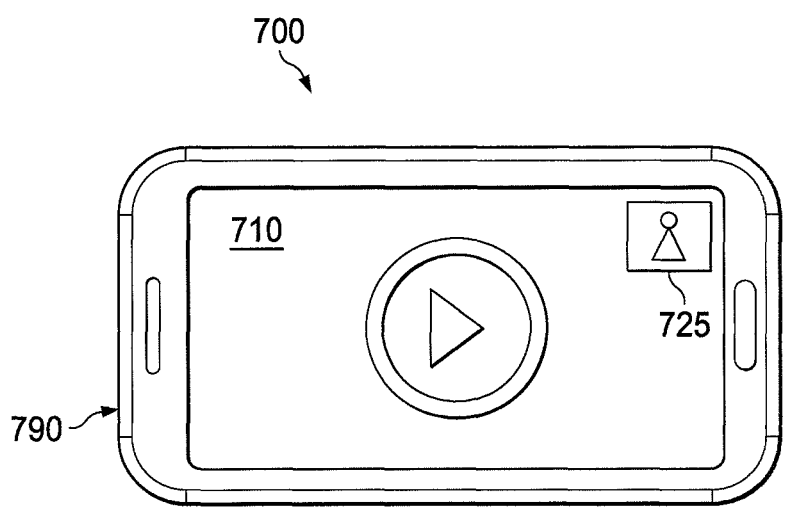

FIGS. 6 and 7 illustrate examples of peer-assisted shopping communication interfaces 600, 700 according to this disclosure. The interface 600 may exist on any suitable device, whereas the interface 700 is shown here as existing on a mobile device. In these particular embodiments, the underlying base content is a video. Again, however, the underling content may be other items, such as a real-time video feed. In such an alternative configuration, a first device may capture video and send it in real-time to a second device, either directly or indirectly (such as through a server intermediary).

With reference to FIG. 6, a container 610 is generally shown that may have features similar to those described above with reference to FIGS. 2A through 2C. A box 620 has been extended from one edge of the container 610 to show that the user is in communication with three different people. The box 620 is shown partitioned into three portions 620A-620C, each of which corresponds to a particular person. Although this particular interface is shown, others may be utilized. For example, the box 620 may be shown as an overlay over the base content. Additionally, the interface may be hidden upon command with, for example, only voice being propagated. Additionally, portions or all of the box 620 may take on a chat room interface if messaging is utilized.

In particular configurations, a user may be allowed to interact with a portion of the box corresponding to a particular person. For example, a user may click on a portion 620A-620C corresponding to a particular person to discover what is in that person's shopping cart.

As referenced above, disparate technologies may be utilized in certain configurations. Accordingly, for example, the portions 620A and 620C may show a video chat interface to initiate a video chat session, whereas the portion 620B may be messaging chatting. In particular embodiments, conversions technologies may be used to convert text-to-voice or voice-to-text in order to accommodate scenarios requiring different communication techniques. The conversion process may occur anywhere in the communication chain, such as at either endpoint or at a server or other intermediary.

Also shown in FIG. 6 is a shopping cart 625, which a user may use to place items. The items could be placed into the shopping cart 625 at one or multiple websites. As described below, the shopping cart 625 of a particular user may be shared with his or her peers, allowing each respective peer to provide feedback.

A variety of tools 640 are also shown to facilitate communication between end users. In particular configurations, the tools 640 may replace some of the tools 240 shown in FIG. 2C. Although shown in the lower portion of the container 610 in this configuration, the tools 640 may take on almost any configuration and can be selectively shown (and hidden) in any of a variety of ways. As non-limiting examples, the tools 640 may be instantiated by hovering over a lower portion of the container or right clicking on the container.

In this example, the tools 640 include a share shopping cart feature 641, a share particular location in video feature 643, a share current content feature 645, a sync feature 647, and a commenting or tagging feature 649. Other features designated "x" and "y" may additionally be incorporated. The share shopping cart feature 641 allows one user to let his or her peers view the items in the shopping cart 625. The shopping cart 625 may contain one or more reverse links back to the location(s) where one or more items were added to the shopping cart 625. For example, it may contain a respective location in a video where a product was viewed and added to the shopping cart 625.

The share particular location in video feature 643 enables one user to direct another user to a particular location in a video. For example, one user may like a particular product (such as shoes) in a video and choose to share that particular location with one or more of his or her peers.

The share current content feature 645 enables the sharing of content the user is currently viewing through the container. For example, if the content is a video, the video may be shared to other users. If the content is a real-time view of something, the real-time view may be recorded (such as with a camera on a user device), and either pictures or video may be sent to another user.

The sync feature 647 allows synchronization of views at different devices. For example, a first user may wish that a second user view the same thing that the first user is viewing. Accordingly, initiating this feature allows the views to be synchronized. In initiating this feature, a user may choose, for example, a start position of a particular video. Multiple user devices can communicate as necessary so that playback is synchronized on those user devices.

The comment or tagging feature 649 allows a user to comment on a time-based and/or coordinate-based portion of content. For example, a first user may want to circle certain shoes at a certain time in a video and share that information with his or her peers. Any suitable annotation features may be utilized. The annotations may store the time and coordinates.

With reference to FIG. 7, a container 710 on a mobile device 790 is generally shown. This container 710 may contain features similar to those described above with reference to FIGS. 2A through 2C. In particular embodiments, the container 710 may cover the entire screen, with other interfaces selectively provided to cover a portion of the base content. For example, as shown here, a box 725 containing communication features (such as video or text chat) may overlay a portion of the container.

Figure 8:
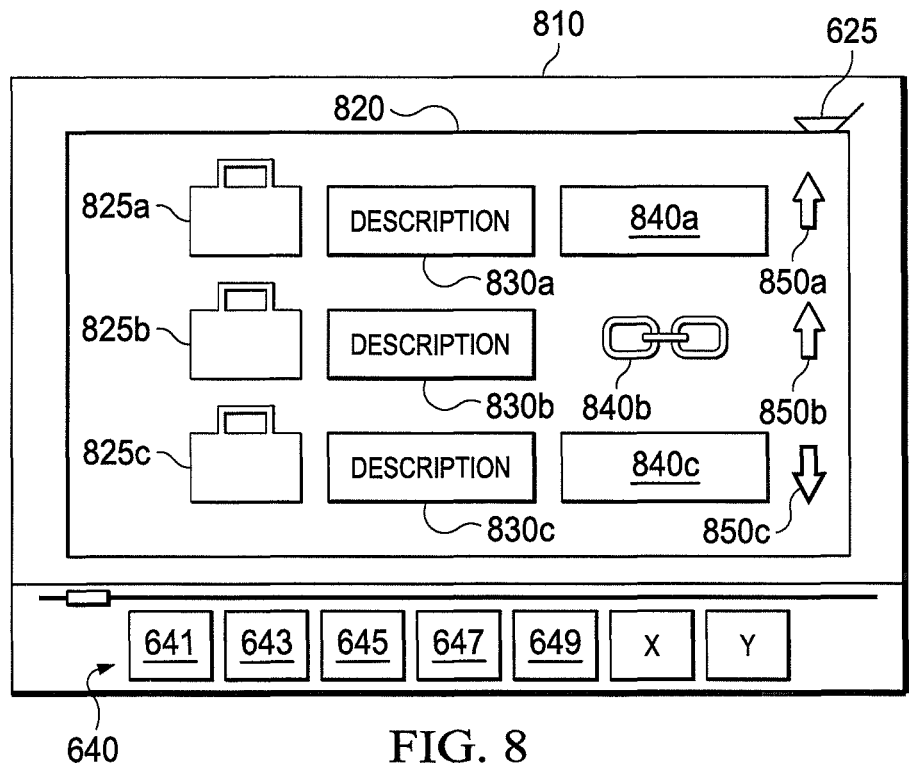
FIG. 8 illustrates an example container with a shopping cart according to this disclosure.

FIG. 8 illustrates an example container 810 with a shopping cart 820 according to this disclosure. The container 810 may contain features similar to those described above with reference to FIGS. 2A through 2C and FIG. 6. In particular embodiments, the container 810 may cover the entire screen, with other interfaces selectively provided to cover a portion of the base content. For example, as shown here, the shopping cart 820 may overlay a portion of the container 810. In this example embodiment, the shopping cart 820 includes items 825a-825c, descriptions 830a-830c of the items 825a-825c, purchase information 840a-840c, and/or review information 850a-850c.

In some embodiments, the shopping cart 820 may represent a shared shopping cart in which multiple users can place items. One shopper can add an item to the shopping cart which could be a suggested item for another shopper. According to certain embodiments, the contents of the shopping cart 820 may contain an identifier of who added each item, along with a link-back to the location from where the item came. In some circumstances, the link-back could point to a video.

Shared shopping carts may be used in a variety of settings. For example, the shopping cart 820 may be utilized by a group planning for a party, with each added item showing the others in the group what they intend on buying. As another example, for high-school girls attending a prom, the shopping cart 820 may be utilized so that each girl may see what other girls intend on wearing to the prom. For items in the shared shopping cart, individuals may be able to comment on the items. Additionally, where a particular shared item has been annotated, the shopping cart 820 may indicate that the item has a comment in the link-back object, which again may be a video.

Even when a shopping cart 820 is being shared, in particular embodiments individual checkouts may occur. When such a checkout has occurred, a notification may be placed in the shopping cart indicting that a particular item has been purchased. Alternatively, if all items in the cart are shared purchase-wise, each person may have an individual check-out for his or her portion of the overall amount. Also, in particular embodiments, whether or not something is shared in a cart can be defined by permissions. For example, an individual cart may begin as an individual cart and quickly be turned into a shared shopping cart by changing permissions.

In various embodiments, a user may be given the opportunity to share a container via networks such as FACEBOOK, MYSPACE, TWITTER, YAHOO, LINKEDIN, GOOGLE, INSTAGRAM, or WORDPRESS. Furthermore, the user may be given the option to copy embed codes and share via email. Each user that can access the shopping cart 820 may be able to review and comment on an item in the shopping cart 820, and the review can be used to update the review information for that item. For example, any user with access to the shopping cart 820 may review an item by clicking a "like" thumb or "+1"ing on GOOGLE PLUS.

In some embodiments, the purchase information 840a-840c may include a price, a quantity, and/or a link-out to other purchase site(s) for each item 825a-825c. For example, the purchase information 840a and 840c may include a price and a quantity with the ability to purchase through the container 810. The purchase information 840b may include a link-out to another website (such as the manufacturer of item 825b), where a user may purchase the item 825b at the other website.

The account login options 245 described above may allow a user to sign into a variety of networks including, for example, CINSAY, FACEBOOK, and GOOGLE. In some embodiments, the container 810 may utilize a single sign-on, global cookies, analytic identifiers, and/or various aggregators to support various functions. For example, a user may log into the container 810 though a single sign-on using FACEBOOK CONNECT, GOOGLE APPS, smart cards, mobile devices, and/or the like. As another example, the container 810 may use global cookies and analytic identifiers to customize the container 810 and the shopping cart 820 for the user. Additionally, these cookies and identifiers may also be used for customized recommendations.

Figure 9:
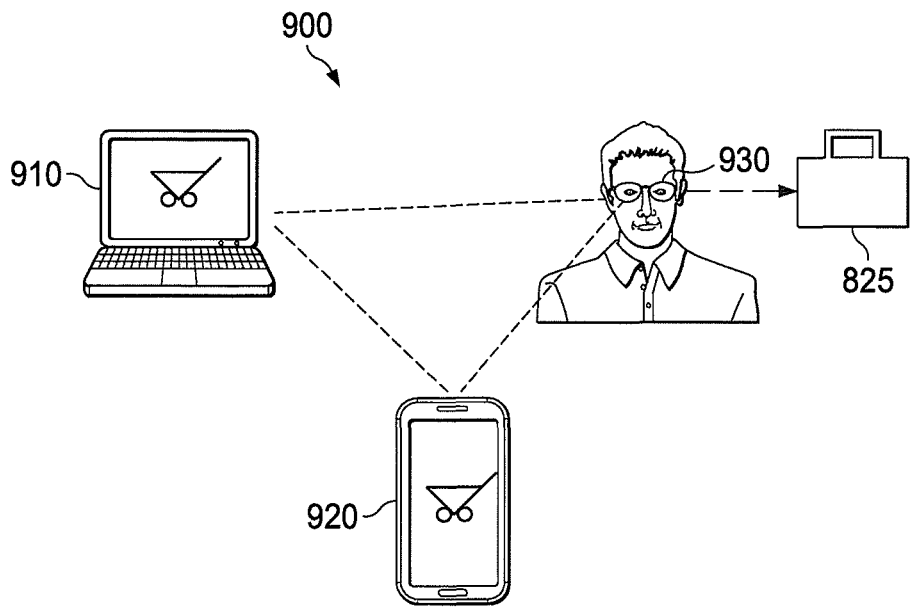
FIG. 9 illustrates another example communication system that can be utilized to facilitate communication between endpoints through a communication network according to this disclosure.

FIG. 9 illustrates another example communication system 900 that can be utilized to facilitate communication between endpoints through a communication network according to this disclosure. As shown in FIG. 9, the system 900 includes endpoints 910-930, which are used by a common user. The endpoints 910-930 represent any suitable communication or computing devices (a laptop computer, mobile phone, and GOOGLE GLASS in this example), although any other devices as described above with respect to the endpoints 110, 120, and 130 could be used. Although each endpoint generally appears as being in a single location, the endpoints may be geographically dispersed (such as in cloud computing scenarios) and may represent fixed or mobile devices.

According to particular embodiments, the user may add items to a shopping cart across devices and across merchants. For example, the user may add a particular item while shopping with a container associated with SAKS FIFTH AVENUE. Later, when viewing a different container associated with NEIMAN MARCUS, the user may add additional information to the cart. Then, a single view of the cart across merchants can be provided. Additionally, the user can check out from both merchants using the single cart. Upon checking out, the system can send separate communications to each respective merchant as to the purchase.

As another example, the user may add something to a cart using a mobile device and then later view the shopping cart using a desktop computer or other device. To enable this technology across merchants and/or across devices, any suitable technology may be utilized, such as cookies, MAC identifiers, account login credentials, single sign-on providers, and the like.

In some embodiments, a peer-assisted shopping option is also provided at one or both endpoints 910-920 to allow communication with one or more other endpoints. For example, in particular embodiments, the user may be shopping at home on the endpoint 910 and, upon seeing something he or she likes, initiate a communication with a peer. The user may also be shopping in a store, see a particular item he or she likes, initiate communication with a peer, and share what he or she sees using a camera of the endpoint 920 or 930.

With reference to various figures described above, the solicitation of feedback by a user may be product- or service-specific. Moreover, there is no requirement that a user obtain feedback from family members or friends, and options can be provided for seeking general feedback from non-friends and non-family members. For example, various embodiments may allow a user to solicit feedback on products or services from other individuals who have purchased or reviewed those products or services in the past or who have opted in for peer-assisted shopping participation and active solicitation. In other configurations, a particular user may solicit information from non-connected users from other networks that the particular user may utilize. In such configurations, the solicitation of information may also encourage the solicited individuals to become users of a network, such as the CINSAY network. As a non-limiting example, one could have a FACEBOOK or GOOGLE+ post (that is automatically posted by CINSAY'S technology) asking friends, groups, circles, or the general public for input on a particular product. In particular configurations, an individual may simply engage in a response. In other configurations, an individual may be prompted to become a CINSAY network participant user or to simply associate his or her current network (such as a FACEBOOK or GOOGLE+ account) with a CINSAY account. In either configuration, the user may be given a variety of control configurations as to who is solicited. As non-limiting examples, the user may have options to solicit friends, groups, or circles in FACEBOOK or GOOGLE+ accounts. The user may also have options to solicit by geographic region (such as city, metropolitan area, region, or state) or by those having certain technological capabilities (such as those that can video chat). The user may further have options to solicit those who purchased within a certain time frame (such as when such purchase statistics are available), to solicit those who purchased from the same company in which a purchase is contemplated, or to solicit every known purchaser of the product. Any other criteria or combinations of criteria (including the preceding criteria) could be used.

Active solicitation may take various forms, including video conversations, chats, SMS messages, emails, or any other form of electronic communication facilitated by the technology. In particular configurations, the receipt of a solicited message may involve an opt-in or opt-out scenario. The receipt of solicitations could be controlled in a manner similar to that described above. For example, solicitations could be received from friends, groups, or circles in FACEBOOK or GOOGLE+ accounts. The receipt of solicitations could also be controlled by geographic region, by those having certain technological capabilities, by those who have purchased or are contemplating a purchase from the same company, or any other criteria or combinations thereof.

Upon product or service selection, a user may additionally be presented with product or service reviews, ratings, or feedback from other product or service users. Current users may choose to solicit additional feedback on a product or service of interest from other users in their network or peer-assisted shopping participants who have opted-in for active solicitation and peer-assisted shopping. Active solicitation is facilitated by the technology and may occur synchronously or asynchronously in a real-time or delayed fashion.

Peer-assisted shopping or active solicitation participants may or may not receive compensation for the rendered assisted services. In cases where service compensation in rendered, it may include forms of payments such as credits, discounts, virtual currency, and legal tender. Unlike general comments on products, certain embodiments provide an actual real-time question/answer session about a particular product or service.

FIG. 10 illustrates an example computing device 1000 supporting peer-assisted e-commerce shopping according to this disclosure. The computing device 1000 could, for example, generally represent any of the endpoints or other computing devices discussed above. The computing device 1000 here could also be used to implement any of the techniques or functions described above, including any combination of the techniques or functions described above. The computing device 1000 may generally be adapted to execute any of suitable operating system, including WINDOWS, MAC OS, UNIX, LINUX, OS2, IOS, ANDROID, or other operating systems.

As shown in FIG. 10, the computing device 1000 includes at least one processing device 1012, a random access memory (RAM) 1014, a read only memory (ROM) 1016, a mouse 1018, a keyboard 1020, and input/output devices such as a disc drive 1022, a printer 1024, a display 1026, and a communication link 1028. In other embodiments, the computing device 1000 may include more, less, or other components. Computing devices come in a wide variety of configurations, and FIG. 10 does not limit the scope of this disclosure to any particular computing device or type of computing device.

Program code may be stored in the RAM 1014, the ROM 1016 or the disc drive 1022 and may be executed by the at least one processing device 1012 in order to carry out the functions described above. The at least one processing device 1012 can be any type(s) of processing device(s), such as one or more processors, microprocessors, controllers, microcontrollers, multi-core processors, and the like. The communication link 1028 may be connected to a computer network or a variety of other communicative platforms, including any of the various types of communication networks 140 described above. The disc drive 1022 may include a variety of types of storage media such as, for example, floppy drives, hard drives, CD drives, DVD drives, magnetic tape drives, or other suitable storage media. One or multiple disc drive 1022 may be used in the computing device 1000.

Note that while FIG. 10 provides one example embodiment of a computer that may be utilized with other embodiments of this disclosure, such other embodiments may utilize any suitable general-purpose or specific-purpose computing devices. Multiple computing devices having any suitable arrangement could also be used. Commonly, multiple computing devices are networked through the Internet and/or in a client-server network. However, this disclosure may use any suitable combination and arrangement of computing devices, including those in separate computer networks linked together by a private or public network.

The computing devices 1000 could represent fixed or mobile devices, and various components can be added or omitted based on the particular implementation of a computing device. For example, mobile devices could include features such as cameras, camcorders, GPS features, and antennas for wireless communications. Particular examples of such mobile devices include IPHONE, IPAD, and ANDROID-based devices.

Although the figures above have described various systems, devices, and methods related to the support of peer-assisted e-commerce shopping, various changes may be made to the figures. For example, the designs of various devices and systems could vary as needed or desired, such as when components of a device or system are combined, further subdivided, rearranged, or omitted and additional components are added. As another example, while various methods are shown as a series of steps, various steps in each method could overlap, occur in parallel, occur in a different order, or occur any number of times. In addition, examples of graphical presentations are for illustration only, and content can be presented in any other suitable manner. It will be understood that well-known processes have not been described in detail and have been omitted for brevity. Although specific steps, structures, and materials may have been described, this disclosure may not be limited to these specifics, and others may be substituted as it is well understood by those skilled in the art, and various steps may not necessarily be performed in the sequences shown.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Other changes, substitutions, and alterations are also possible without departing from the invention as defined by the following claims.

What is claimed is:

1. A computer-implemented method, comprising:
executing, locally at a first compute device, a media container configured to instantiate (i) a first playback of video content including an image item, (ii) a graphical control interface including a graphical representation associated with the image item, (iii) a graphical communication interface configured to support communication with a second compute device during display of the first playback of the video content at the first compute device, and (iv) a shopping cart associated with the media container;
receiving, at the first compute device, an indication that a first user associated with the first compute device selected the graphical representation;
displaying, via the graphical communication interface an endpoint indicator associated with the second compute device, the second compute device being associated with a second user;
receiving, at the first compute device, an indication that the first user selected the endpoint indicator to initiate communication with the second compute device;
determining, via the media container, a set of communication parameters associated with the second compute device;
initiating, via the media container, and based on the set of communication parameters associated with the second compute device and the indication that the first user selected the endpoint indicator, a network communication channel from the first compute device to the second compute device; and
transmitting, via the network communication channel, a signal to cause the second compute device to display (i) a second playback of the video content and (ii) the graphical representation selected by the first user.

2. The computer-implemented method of claim 1, further comprising:
receiving, at the first compute device, feedback information related to the graphical representation selected by the first user, the feedback information sent by the second user via the network communication channel and the second compute device.

3. The computer-implemented method of claim 1, wherein the image item is from a plurality of image items, the computer-implemented method further comprising:
receiving, at the first compute device, a suggested image item from the plurality of image items, the suggested image item being sent by the second user via the network communication channel and the second compute device.

4. The computer-implemented method of claim 1, wherein the endpoint indicator is a first endpoint indicator from a plurality of endpoint indicators displayed via the graphical communication interface, the computer-implemented method, further comprising:
receiving, at the first compute device, an indication that the first user seeks to initiate a video chat session;
displaying a plurality of contact names via the graphical communication interface, each contact name from the plurality of contact names associated with an endpoint indicator from the plurality of endpoint indicators;
receiving, at the first compute device, an indication that the first user has selected a contact name from the plurality of contact names; and
initiating the video chat session, via the media container, with a third user associated with the contact name.

5. The computer-implemented method of claim 1, wherein:
the endpoint indicator is a first endpoint indicator from a plurality of endpoint indicators displayed via the graphical communication interface;
the network communication channel is a first the network communication channel via a first communication technology; and
initiating the first network communication channel further comprises:
displaying a plurality of contact names via the graphical communication interface, each contact name from the plurality of contact names associated with an endpoint indicator from the plurality of endpoint indicators;
receiving, at the first compute device, an indication that the first user has selected a contact name from the plurality contact names; and
initiating a second network communication channel with a third compute device associated with the contact name selected by the first user, the second network communication channel being via a second communication technology different from the first communication technology.

6. The computer-implemented method of claim 1 further comprising:
receiving, at the first compute device, an indication from the first user to share the video content, including an indication of a start location, with the second compute device,
the signal transmitted via the network communication channel includes the indication of the start location, such that the second playback of the video content proceeds from the start location.

7. The computer-implemented method of claim 1, further comprising:
receiving, from the first user, one or more annotations related to the graphical representation selected by the first user;
associating the one or more annotations with a presentation of the image item associated with the graphical representation selected by the first user in the first playback of the video content; and
sending the one or more annotations, to the second compute device via the network communication channel such that the one or more annotations are displayed during the display of the image item during the second playback of the video content at the second compute device.

8. The method of claim 1, wherein the shopping cart is a first shopping cart and the signal sent to the second compute device via the network communication channel is a first signal that further causes the second compute device to:
display, at the second compute device, a second shopping cart associated with the second user; and
initiate transmission of a second signal from the second compute device to the first compute device via the network communication channel to cause the first compute device to synchronize the first shopping cart with the second shopping cart synchronize the first shopping cart associated with the first compute device and a second shopping cart associated with the second compute device to enable sharing of a purchase of at least one of a product or service associated with the one or more image items.

9. The method of claim 1, further comprising:
determining, via the media container, a set of communication parameters associated with the first compute device; and
negotiating, based on the set of communication parameters associated with the first compute device and the set of communication parameters associated with the second compute device, a mode of communication, the initiating the network communication channel being based on the negotiation.

10. The method of claim 1, further comprising:
determining a first communication environment available to the first compute device;
determining a second communication environment different from the first communication environment that is available to the second compute device; and
establishing the network communication channel via the first communication environment at the first compute device and the second communication environment at the second compute device.

11. An apparatus, comprising:
one or more processors;
a graphical display;
a memory having computer-executable instructions and in communication with the one or more processors;
the one or more processors, upon execution of the computer-executable instructions in the memory, configured to:
instantiate, at a first compute device associated with the one or more processors, a media container, the media container configured, upon instantiation, to display (i) a first playback of video content including an image item, (ii) a graphical control interface displaying a graphical representation related to the image item, (iii) a graphical communication interface to configured to support communication with a second compute device during display of the first playback of the video content at the first compute device, and (iv) a shopping cart associated with the first user;
receive, at the first compute device an indication that a first user associated with the first compute device selected the graphical representation;
display, via the graphical communication interface, an endpoint indicator associated with the second compute device, the second compute device being associated with a second user;
receive, at the first compute device, an indication that the first user selected the endpoint indicator to initiate communication with the second compute device;
determine, via the media container, a set of communication parameters associated with the second compute device;
initiate, via the media container and based on the set of communication parameters associated with the second compute device and the indication that the first user selected the endpoint indicator, a network communication channel with the second compute device; and
send to the second compute device, via the network communication channel, a signal to ca use the second compute device to display (i) a second playback of the video content, and (ii) the graphical representation selected by the first user.

12. The apparatus of claim 11, wherein the one or more processors is further configured to:
receive feedback information related to the graphical representation selected by the first user, the feedback information sent by the second user via the network communication channel and the second compute device.

13. The apparatus of claim 11, wherein the image item is from a plurality of image items, the one or more processors is further configured to:
receive a suggested image item from the plurality of image items, via the network communication channel and the second compute device.

14. The apparatus of claim 11, wherein the one or more processors is further configured to:
receive a command to initiate a video chat session;
display multiple contact names via the graphical communication interface;
receive a selection of a contact name from the multiple contact names; and
initiate the video chat session via the media container with a third user associated with the contact name that was selected.

15. The apparatus of claim 11, wherein:
the endpoint indicator is a first endpoint indicator from a plurality of endpoint indicators displayed via the graphical communication interface; and
the network communication channel is a first network communication channel and via a first communication technology, the one or more processors being further configured to:
display a plurality of contact names via the graphical communication interface, each contact name from the plurality of contact names associated with an endpoint indicator from the plurality of endpoint indicators;
receive, at the first compute device, an indication that the first user has selected a contact name from the plurality of contact names; and
initiate, via the media container, a second network communication channel with a third compute device associated with the contact name selected by the first user, the second network communication channel being via a second communication technology different from the first communication technology.

16. The apparatus of claim 11, wherein the one or more processors is further configured to:
receive a second command to share with the second user a copy of the video content, including an indication of a start location, and a copy of the graphical control interface; and
send, as included in the digital information, the copy of the video content, the indication of the start location, and the copy of the graphical control interface to the second user via the network communication channel and to the second compute device.

17. The apparatus of claim 11, wherein the one or more processors is further configured to:
receive, from the first user, one or more annotations related to the graphical representation selected by the first user;
associate the one or more annotations with a presentation of an image item associated with the graphical representation selected by the first user in the playback of the video content; and
send the one or more annotations to the second compute device via the network communication channel such that the one or more annotations are displayed during the display of the image item during the second playback of the video content at the second compute device.

18. The apparatus of claim 11, the shopping cart associated with the first user being a first shopping cart and the signal sent to the second compute device via the network communication channel being a first signal that further causes the second compute device to:
display a second shopping cart associated with the second user,
initiate transmission of a second signal from the second compute device and to the first compute device via the network communication channel to cause the first compute device to synchronize the first shopping cart with the second shopping cart.

19. The apparatus of claim 11, the one or more processors, upon execution of the computer-executable instructions in the memory, further configured to:
determine a set of communication parameters associated with the first compute device;
negotiate, based on the set of communication parameters associated with the first compute device and the set of communication parameters associated with the second compute device, a mode of communication, the network communication channel being initiated in response to the negotiation.

20. The apparatus of claim 8, the one or more processors, upon execution of the computer-executable instructions in the memory, further configured to:
determine a first communication environment available to the first compute device;
determine a second communication environment different from the first communication environment that is available to the second compute device; and
establish the network communication channel via the first communication environment at the first compute device and the second communication environment at the second compute device.

21. A non-transitory computer-readable medium storing computer-executable instructions, the computer-executable instructions configured when executed to cause a first compute device to:
instantiate locally, at the first compute device, a media container configured, upon instantiation, to display (i) a first playback of a video content including an image item, (ii) a graphical control interface displaying a graphical representation associated with the image item, and (iii) a graphical communication interface configured to support communication with a second compute device during display of the first playback of the video content;
receive, at the first compute device, an indication that a first user associated with the first compute device selected the graphical representation;
display, via the graphical communication interface an endpoint indicator associated with the second compute device associated with a second user;
receive, at the first compute device, an indication that the first user selected the endpoint indicator to initiate communication with the second compute device;
determine, via the media container, a set of communication parameters associated with the second compute device;
initiate, via the media container and based on the set of communication parameters associated with the second compute device and the indication that the first user selected the endpoint indicator, a network communication channel with the second compute device; and send to the second compute device, via the network communication channel, a signal to cause the second compute device to display (i) a second playback of the video content, and (ii) the graphical representation selected by the first user.

22. The non-transitory computer-readable medium of claim 21, wherein the computer-executable instructions are further configured to cause the first compute device to receive feedback information related to the graphical representation selected by the first user, the feedback information sent by the second user via the network communication channel and the second compute device.

23. The non-transitory computer-readable medium of claim 21, wherein the image item is from a plurality of image items, and the computer-executable instructions are further configured to cause the first compute device to receive a suggested image item from the plurality of image items, via the network communication channel and the second compute device.

24. The non-transitory computer-readable medium of claim 21, wherein the endpoint indicator is a first endpoint indicator from a plurality of endpoint indicators displayed via the graphical communication interface, and the computer-executable instructions are further configured to cause the first compute device to:
receive an indication that the first user seeks to initiate a video chat session;
display multiple contact names on the graphical communication interface, each contact name from the multiple contact names associated with an endpoint indicator from the plurality of endpoint indicators;
receive at the first compute device, an indication that the first user has selected a contact name from the multiple contact names; and
initiate the video chat session via the media container with a third user associated with the contact name.

25. The non-transitory computer-readable medium of claim 21, wherein:
the endpoint indicator is a first endpoint indicator from a plurality of endpoint indicators; and
the network communication channel is a first the network communication channel via a first communication technology,
the computer-executable instructions to cause the first compute device to initiate the first network communication channel further includes computer-executable instructions to:
display a plurality of contact names via the graphical communication interface, each contact name from the plurality of contact names associated with an endpoint indicator from the plurality of endpoint indicators;
receive, at the first compute device, an indication that the first user has selected a contact name from the plurality of contact names; and
initiate a second network communication channel with a third compute device associated with the contact name, the second network communication channel being via a second communication technology different from the first communication technology.

26. The non-transitory computer-readable medium of claim 21, wherein the computer-executable instructions are further configured to cause the first compute device to:
receive, at the first compute device, an indication from the first user to share the video content, including an indication of a start location,
the signal transmitted via the network communication channel includes the indication of the start location such that the second playback of the video content proceeds from the start location.

27. The non-transitory computer-readable medium of claim 21, wherein the computer-executable instructions are further configured to cause the first compute device to determine, via the media container, a content feed associated with the media container, the network communication channel being initiated based on the content feed.

28. The non-transitory computer-readable medium of claim 21, wherein the set of communication parameters includes a n indication of network bandwidth.

29. The non-transitory computer-readable medium of claim 21, wherein the set of communication parameters includes an indication of communication technologies available to the second compute device, the communication technologies including at least one of voice-over Internet Protocol (VOIP), video chatting, text chatting, or mobile phone communication.

30. The non-transitory computer-readable medium of claim 21, wherein the computer-executable instructions are further configured to cause the first compute device to
determine, via the media container, a set of communication parameters associated with the first compute device; and
negotiate, based on the first set of communication parameters associated with the first compute device and the second set of communication parameters associated with the second compute device, a mode of communication, the network communication channel being initiated in response to the negotiation.

31. The non-transitory computer-readable medium of claim 21, wherein the computer-executable instructions are further configured to cause the first compute device to determine a first communication environment available to the first compute device;
determine a second communication environment different from the first communication environment that is available to the second compute device; and
establish the network communication channel via the first communication environment at the first compute device and the second communication environment at the second compute device.

* * * * *